United States Patent
Krume

(10) Patent No.: US 11,541,705 B2
(45) Date of Patent: Jan. 3, 2023

(54) TRACTION ASSIST SYSTEM AND METHOD FOR MOBILE HEAVY EQUIPMENT

(71) Applicant: Tigercat Industries Inc., Brantford (CA)

(72) Inventor: Eric Russell Krume, Castle Rock, WA (US)

(73) Assignee: Tigercat Industries Inc., Brantford (CA)

( * ) Notice: Subject to any disclaimer, the term of this patent is extended or adjusted under 35 U.S.C. 154(b) by 0 days.

(21) Appl. No.: 16/271,066

(22) Filed: Feb. 8, 2019

(65) Prior Publication Data

US 2019/0168551 A1    Jun. 6, 2019

Related U.S. Application Data

(63) Continuation of application No. PCT/CA2017/050946, filed on Aug. 10, 2017.

(Continued)

(51) Int. Cl.
*B60D 1/18*  (2006.01)
*A01G 23/00* (2006.01)
*B60P 3/41*  (2006.01)

(52) U.S. Cl.
CPC ............. *B60D 1/18* (2013.01); *A01G 23/006* (2013.01); *B60P 3/41* (2013.01); *A01G 23/00* (2013.01); *B60Y 2200/222* (2013.01)

(58) Field of Classification Search
CPC ........ B60D 1/18; A01G 23/006; A01G 23/00; B60P 3/21; B60Y 2200/222; E02F 3/80; E02F 3/815

(Continued)

(56) References Cited

U.S. PATENT DOCUMENTS 3,049,186 A * 8/1962 Garrett ............... B60P 3/41
                                            180/235
3,881,751 A * 5/1975 Colby ................ B60D 1/185
                                            280/480

(Continued)

FOREIGN PATENT DOCUMENTS

CN   202298695     7/2012
GB   1283056 A *  7/1972 ........... A01G 23/006

OTHER PUBLICATIONS

Canadian Intellectual Property Office as International Searching Authority, International Search Report for PCT/CA2017/050946, dated Nov. 2, 2017.

(Continued)

*Primary Examiner* — Jacob D Knutson
(74) *Attorney, Agent, or Firm* — Neil W. Henderson; Amarok IP Inc.

(57) ABSTRACT

A traction assist system and method for heavy equipment on an incline or in other situations with poor or limited traction. In particular, a traction assist system for heavy equipment having an accessory such as a blade, the system including: a tether; an adaptation to the accessory allowing the tether to be placed to allow the accessory to function without disrupting the tether, such as through-holes in the blade; and an attachment point on the heavy equipment for attaching the tether to the heavy equipment. The adaptation will depend on the particular accessory involved but may generally be an adaptation allowing the tether to pass through the accessory.

14 Claims, 6 Drawing Sheets

Related U.S. Application Data

(60) Provisional application No. 62/373,044, filed on Aug. 10, 2016.

(58) Field of Classification Search
USPC .................................. 172/701.1; 280/480
See application file for complete search history.

(56) References Cited

U.S. PATENT DOCUMENTS

| | | | | |
|---|---|---|---|---|
| 3,956,835 A | | 5/1976 | Evenson | |
| 4,076,080 A | * | 2/1978 | Anderson | E02F 3/7613 172/247 |
| 4,145,825 A | * | 3/1979 | Bertolino | E01H 5/065 172/113 |
| 4,167,274 A | * | 9/1979 | Trittipoe | B62D 53/02 280/477 |
| 4,309,142 A | * | 1/1982 | Shumaker | E02F 9/26 172/430 |
| 4,635,953 A | * | 1/1987 | Robertson | B60D 1/185 280/480 |
| 4,784,517 A | * | 11/1988 | Bergqvist | E01C 23/082 172/701.1 |
| 5,039,272 A | * | 8/1991 | Holmes | B60P 3/125 280/402 |
| 5,215,325 A | * | 6/1993 | Novotny | B60D 1/18 280/480.1 |
| 5,497,569 A | * | 3/1996 | Byman | B66F 9/12 15/245 |
| 5,515,624 A | * | 5/1996 | Beatty | E02F 3/60 37/316 |
| 5,967,539 A | * | 10/1999 | Digman | B60D 1/28 280/480 |
| 7,426,795 B2 | * | 9/2008 | Raddon | E01H 5/06 172/817 |
| 7,600,575 B2 | * | 10/2009 | Fredrick | E02F 3/7609 172/253 |
| 2009/0188684 A1 | * | 7/2009 | Parrish | E02F 3/8152 172/684.5 |
| 2019/0112781 A1 | * | 4/2019 | Winter | E02F 3/8152 |

OTHER PUBLICATIONS

Canadian Intellectual Property Office as International Searching Authority, International Preliminary Report on Patentability for PCT/CA2017/050946, dated Feb. 12, 2019.

English translation of Abstract of CN202298695, retrieved from Espacenet May 8, 2019.

\* cited by examiner

TRACTION ASSIST SYSTEM AND METHOD FOR MOBILE HEAVY EQUIPMENT

REFERENCE TO RELATED APPLICATION(S)

This is a formal application based on and claiming the benefit of U.S. Provisional Application No. 62/373,044, filed Aug. 10, 2016, which is hereby incorporated herein by reference.

FIELD

This disclosure relates to the field of mobile heavy equipment and, in particular, to systems and methods for traction assist of mobile heavy equipment. A particular application is for forestry equipment operating on an incline.

INTRODUCTION

In many cases, mobile heavy equipment is required to operate in an area where there may be low or reduced traction. For example, on an incline or in bad ground conditions, such as wet areas. As a particular example, forestry companies are seeking to harvest trees in more remote or non-typical areas, such as on increasing inclines and/or in areas having poor ground conditions, including swamps and the like. As the incline increases or ground conditions deteriorate, the potential for loss of traction becomes higher, limiting the mobility of the heavy equipment.

In some cases, it is possible to use a tether in the form of a cable or chain to assist heavy equipment on an incline or in bad ground conditions. In this situation, the tether is attached at one end of the heavy equipment to be assisted and also attached/fastened at the other end to another piece of heavy equipment or an embedded or stationary object which can provide tension to the tether in order to assist the heavy equipment with traction. The tether also typically runs via a winch or the like to allow the tether to be pulled in or further tensioned and/or released when necessary, for example, during movement of the heavy equipment.

It has been found that it can be difficult to use a tethering system with some types of heavy equipment. For example, in the forestry example, on heavy equipment such as skidders and forwarders, it may be desirable to provide a tether at a forward end of the equipment, which will also typically have a bulldozer or plow-type blade mounted thereon. In such a situation, the tether may interfere with operation of the blade and/or there may be a risk of the tether being damaged by operation of the blade. As such, there is a need for an improved system and method of providing traction assist for heavy equipment.

SUMMARY

The present document provides an improved system and method for providing a traction assist (via tethering) for heavy equipment for use on inclined surfaces or in other situations where there is poor or limited traction.

According to an aspect herein, there is provided a traction assist system for heavy equipment having an accessory, the system including: a tether; an adaptation to the accessory allowing the tether to be placed to allow the accessory to function without disrupting the tether; and an attachment point on the heavy equipment for attaching the tether to the heavy equipment. The adaptation will depend on the particular accessory involved but may generally be an adaptation allowing the tether to pass through the accessory.

In a particular case, the attachment point may be positioned on the heavy equipment at a point past an axle well that is adjacent to the accessory.

In another particular case, the accessory may be a blade (dozer or plow) and the adaptation may be a through-hole provided in the blade.

In yet another particular case, the tether may include a plurality of branches, the adaptation may include a plurality of adaptations, and the attachment point may include a plurality of attachment points. In particular, the tether may be a single tether that branches into a plurality of branches, each running to the plurality of adaptations and attachment points or there may actually be several tethers (each of which is a branch) all coming from different anchor points and each running to the plurality of adaptations and attachment points In still yet another particular case, the heavy equipment may be forestry equipment. Further, the forestry equipment may be a skidder or forwarder.

According to another aspect herein, there is provided a traction assist system for heavy equipment having a bulldozer blade, the system including: a tether; a through-hole provided in the bulldozer blade; and an attachment point on the heavy equipment for attaching the tether.

In a particular case for this aspect, the attachment point may be positioned on the heavy equipment at a point past an axle well that is adjacent to the bulldozer blade. In this way, the attachment point is at a strong point on the chassis and provides further leeway for the tether to move in conjunction with the blade than if the attachment point were nearer to the blade.

In another particular case, the tether may include a plurality of branches, the through-hole may include a plurality of through-holes, and the attachment point may include a plurality of attachment points.

In yet another particular case, the heavy equipment may be forestry equipment. Further, the forestry equipment may be a skidder or forwarder.

According to another aspect herein, there is provided a method for traction assist for heavy equipment having an accessory, the method including: providing a tether; adapting the accessory to allow the tether to run through the accessory; and attaching the tether to an attachment point on the heavy equipment.

In a particular case for this aspect, the tether may include a plurality of branches, the adapting may include a plurality of adaptations, and the attachment point may include a plurality of attachment points.

In another particular case, the accessory may be a blade and the adapting may include providing a through-hole in the blade.

In yet another particular case, the heavy equipment may be forestry equipment. Further, the forestry equipment may be a skidder or forwarder.

BRIEF DESCRIPTION OF THE DRAWINGS

Embodiments of the disclosure will now be described, by way of example only, with reference to the attached drawings, in which.

DETAILED DESCRIPTION

Figure 1:
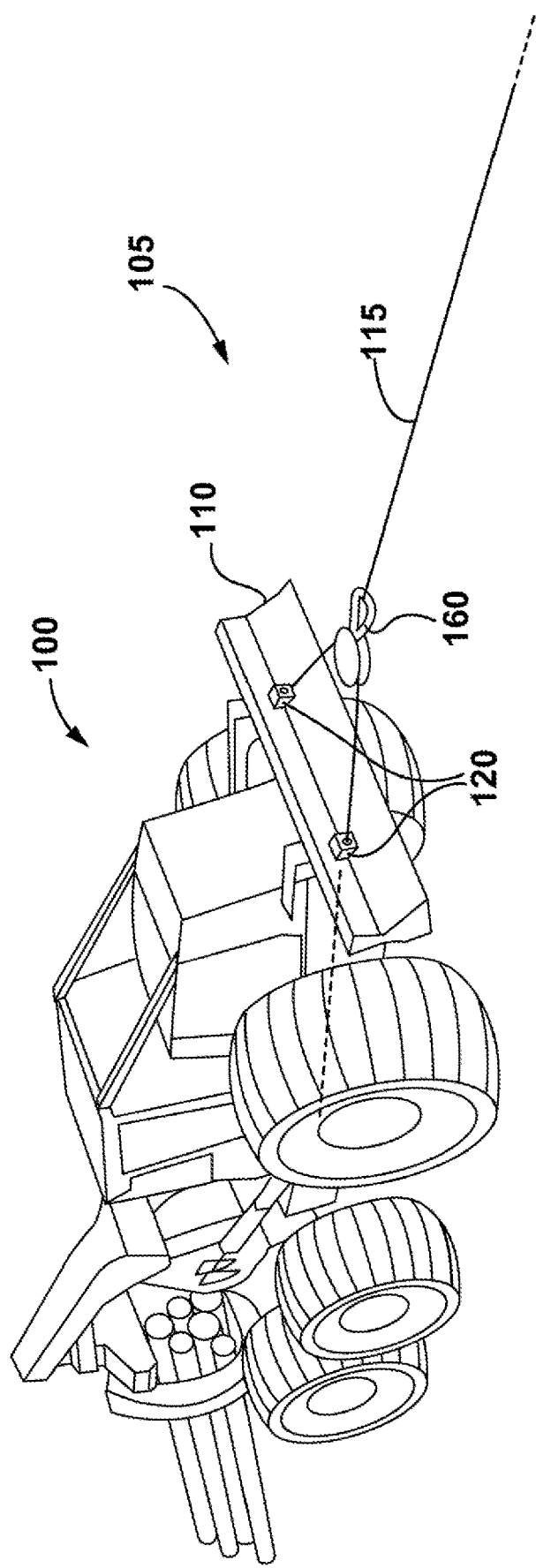
FIG. 1 illustrates an embodiment of a system for traction assist of heavy equipment as applied to a log skidder.

The following description, with reference to the accompanying drawings, is provided to assist in understanding the example embodiments. The following description includes various specific details to assist in that understanding but these are to be regarded as merely examples. Accordingly, those of ordinary skill in the art will recognize that the various embodiments and changes and modifications thereto described herein can be made without departing from the scope and spirit of the appended claims and their equivalents. Further, elements of each embodiment may be used in other embodiments. In addition, descriptions of well-known functions and constructions may be omitted for clarity and conciseness.

The terms and words used in the following description and claims are not limited to their bibliographical meanings, but, are meant to be interpreted in context and used to enable a clear and consistent understanding.

As noted above, some heavy equipment may have accessories (such as a blade (e.g. bulldozer, plow surface clearing), mulcher tool, or the like) attached to the equipment that can interfere with a tether that is used for traction assist. This can result in reduced usability of the accessory and/or a risk that the tether will be damaged during use of the accessory. In particular, for a blade, if the tether is below the blade either the blade cannot be used or the tether might be damaged when the blade is lowered for use. One further issue for some heavy equipment, such as forestry equipment, that has not been fully understood is the strength of the chassis at attachment points for the tether. This is because, in some cases, the tether holds a substantial part of the weight of the heavy equipment. In the forestry example, some equipment, such as a skidder, has a different type of chassis than, for example, a track feller buncher because it operates on wheels with an axle rather than on a track system. In particular, the skidder chassis will include an axle well, which can result in a thinner/weaker part of the chassis at the forward end (that is, forward of the axle well). A forwarder may have similar issues as the skidder because a forwarder is also typically wheeled and can be equipped with an accessory such as a blade. Other forestry equipment having either wheels and/or accessories such as blades on their chassis may have similar concerns.

Generally speaking, embodiments of the improved system and method involve: (a) modifying or adapting an accessory (as noted above, a blade, mulcher, or the like) on the chassis of heavy equipment and feeding the tether appropriately to avoid cutting or tangling of the tether; and (b) attaching the tether to the equipment chassis or adapting the equipment chassis in such a way that the equipment chassis can withstand the forces placed on the chassis by the tether.

In the following description, the focus is on forestry equipment, and, in particular a log skidder, however similar principles will apply to other types of heavy equipment, including, without limitation, a forwarder and the like. Further, the focus is also on a blade as the accessory being adapted but other types of accessories may be similarly adapted in appropriate situations.

FIG. 1 is a view of heavy equipment (in this case, a log skidder) 100 that includes an embodiment of the traction assist system 105 so that it can be tethered for use on an incline. The skidder 100 includes an accessory 110 and one end thereof, in this case a blade 110. The traction assist system 105 includes: a tether 115, an adaptation 120 of the accessory 110, and an attachment point 125 (not visible in FIG. 1) on the heavy equipment 100. The traction assist system 105 could also be used in other situations where there is limited traction, rather than just on an incline. As noted above, the opposite end of the tether from the heavy equipment is attached/fastened to another piece of heavy equipment or an embedded or stationary object (not shown). In some cases, the attachment at the upper end of the tether may be via a winch or the like (not shown), which can provide tension to the tether in order to assist the skidder with traction.

Figure 2:
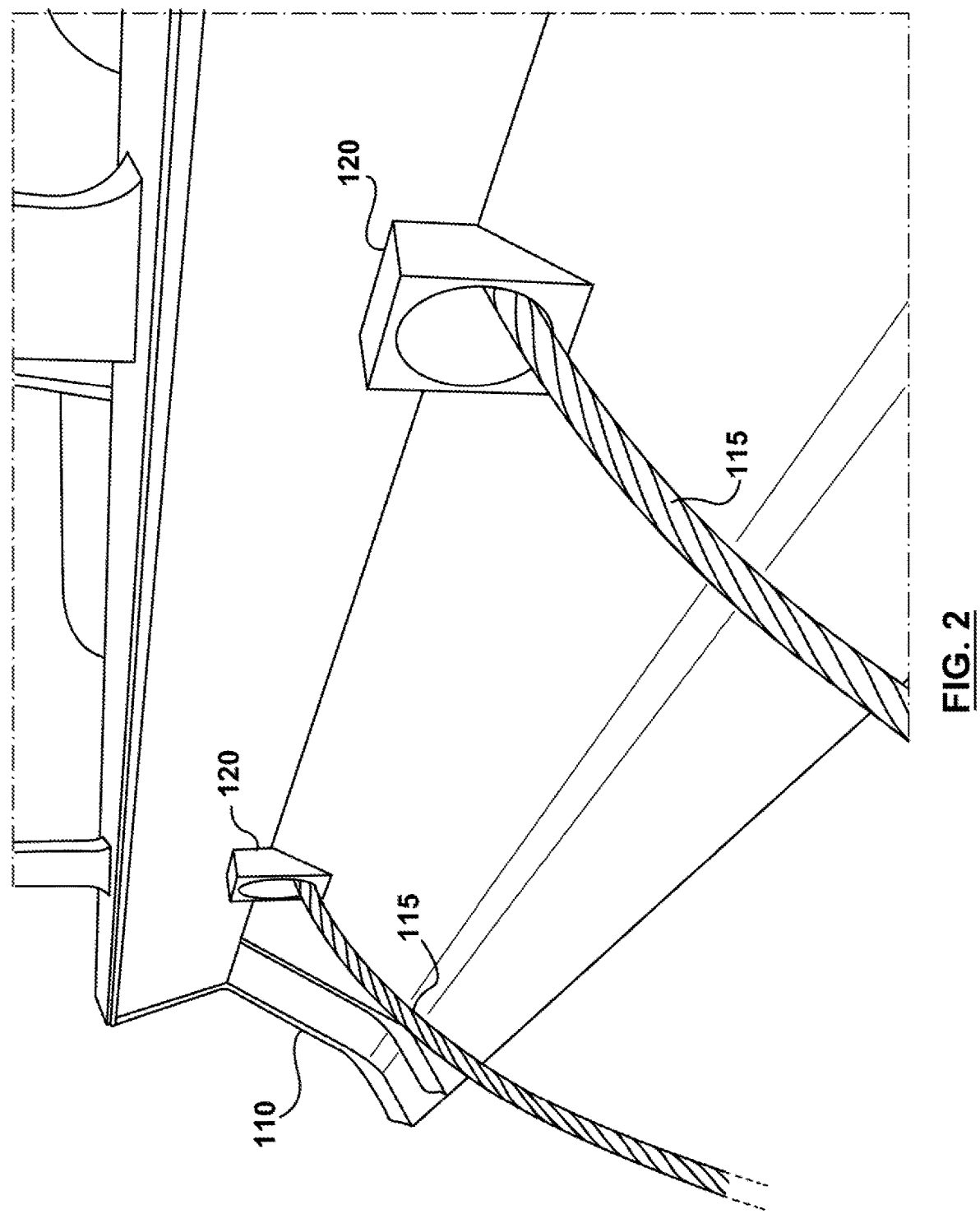
FIG. 2 illustrates a detailed view of a bulldozer blade according to the embodiment of FIG. 1.
Figure 3:
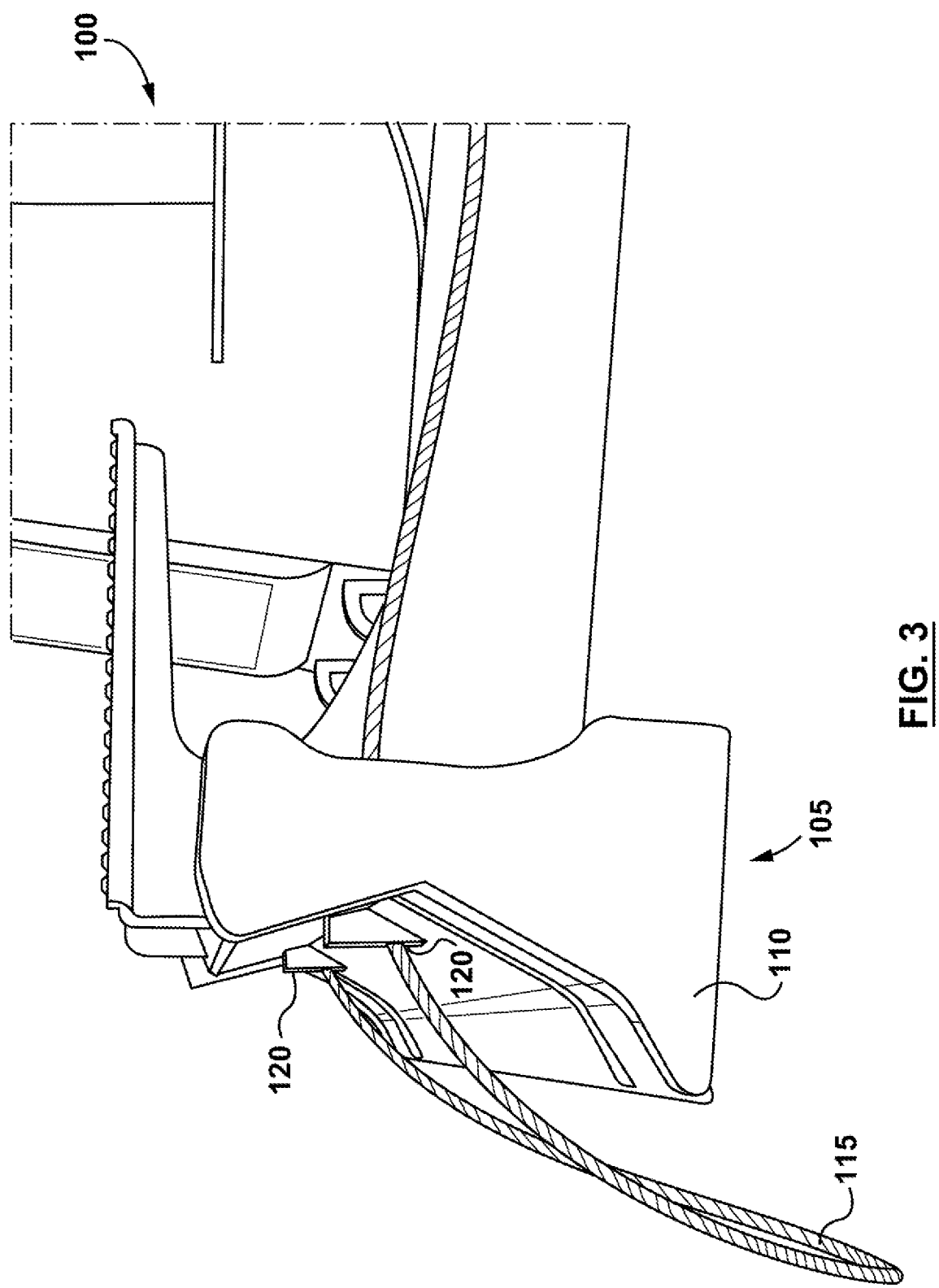
FIG. 3 is a side view of the bulldozer blade of FIG. 2.

FIG. 2 is a detailed view and FIG. 3 is a side view of the blade 110 of the skidder 100 of FIG. 1 showing the adaptation to the blade 110. As shown in FIGS. 2 and 3, the blade 110 is adapted by providing through-holes 120 so that the tether 115 can pass through the blade 110. In this case, the tether 115 divides into two so there are two through-holes 120 in the blade 110. In some cases, there may be a single tether and a single through hole while, while in other cases, there may be multiple tethers and/or a tether may be divided at some point between the winch and the heavy equipment to provide separate tethers, in which case there will be an appropriate number of through holes. Each of the through-holes in the blade will be configured to reduce friction and wear on the tether. In particular, the through-holes will have generally smooth edges so that the tether will not catch or bind when the blade is at various angles.

Figure 4:
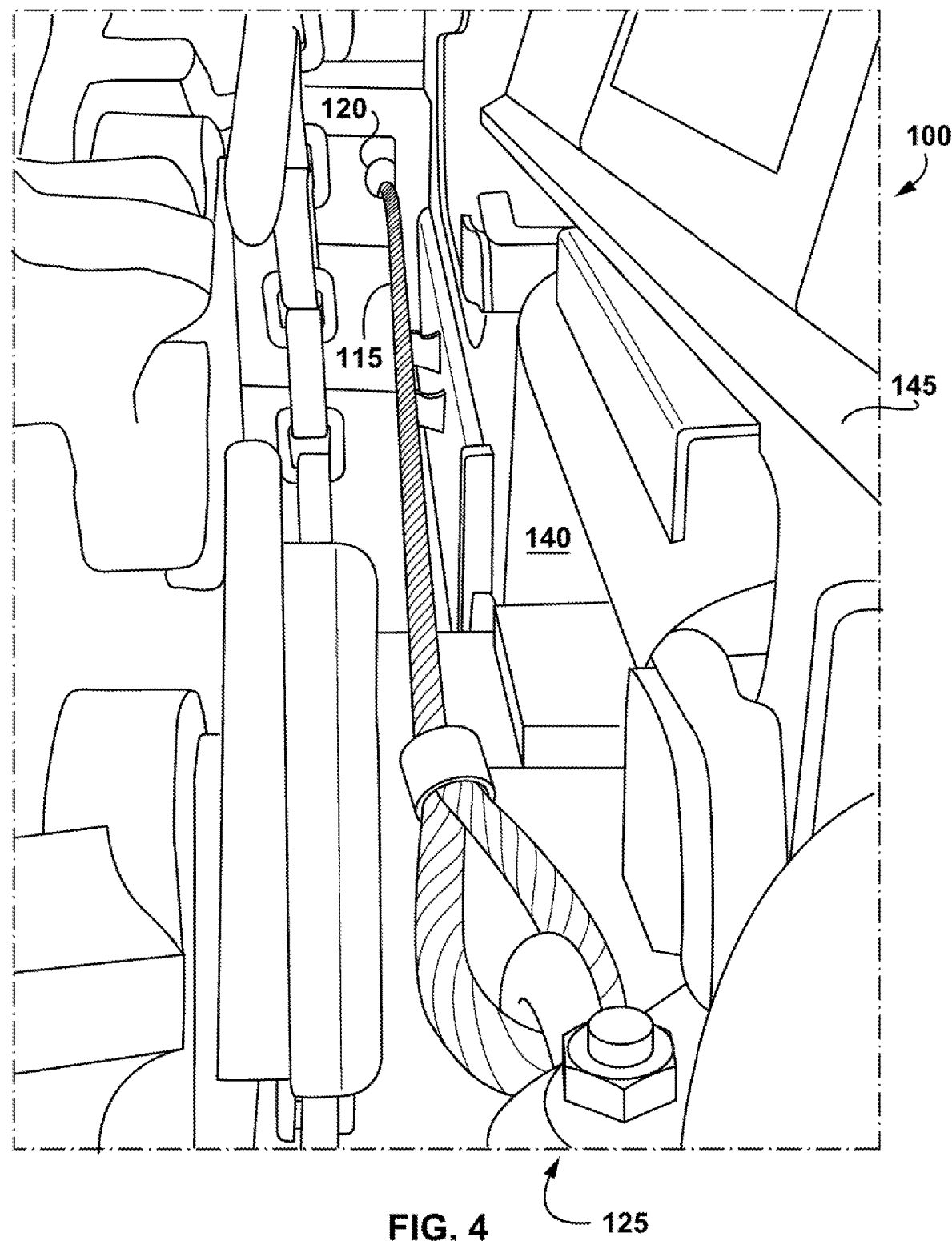
FIG. 4 illustrates an attachment point according to an embodiment of the system for traction assist.
Figure 5:
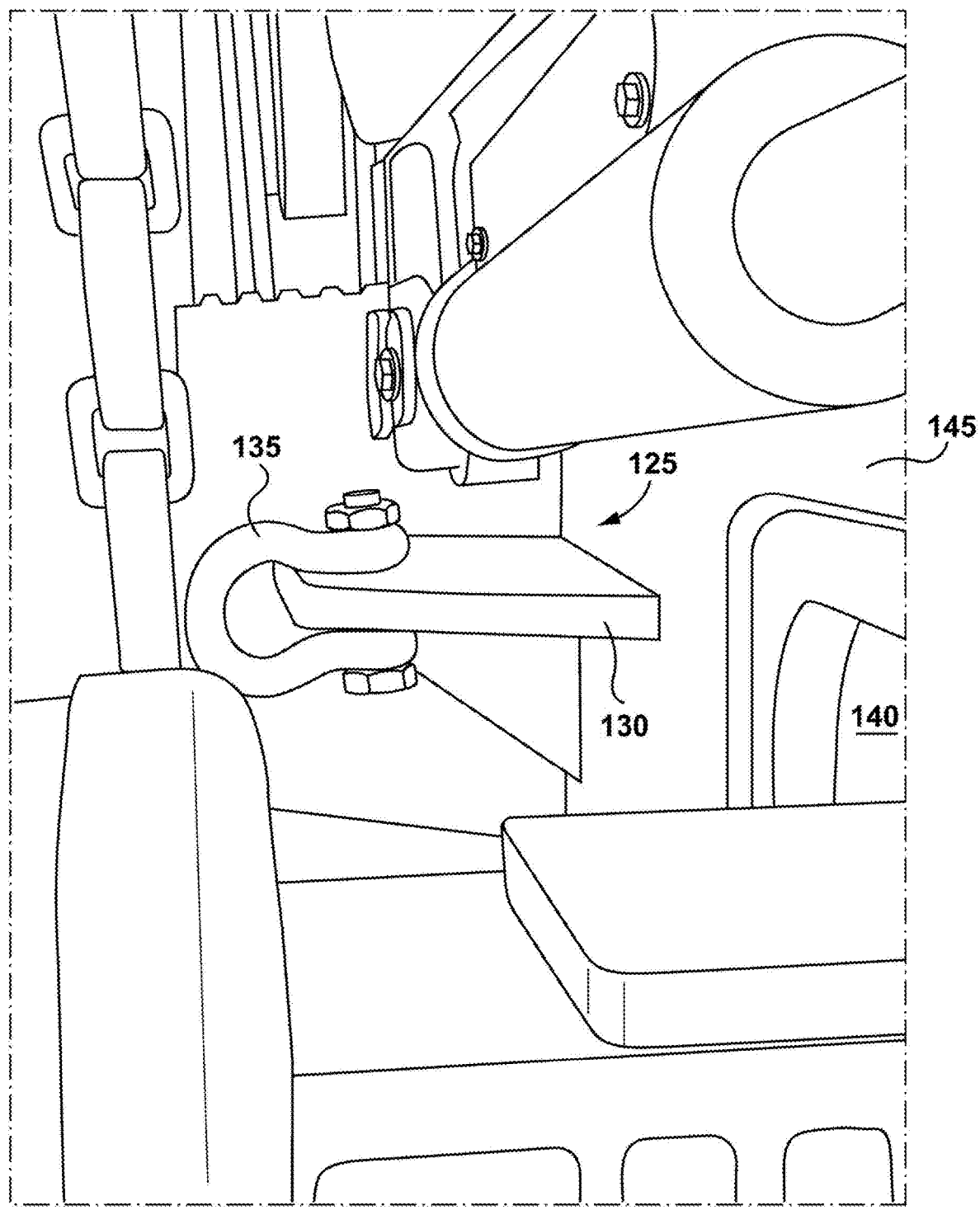
FIG. 5 illustrates a front view of the attachment point of FIG. 5.

FIG. 4 is a view facing forward in relation to the equipment 100 and showing the tether 115 passing through the through hole 120 and attaching to the attachment point 125 on the skidder 100. FIG. 5 is a view facing rearward in relation to the equipment 100 and showing an attachment point 125, including an attachment plate 130 and an attachment shackle 135 on the skidder 100. As shown in FIGS. 4 and 5, in this embodiment, the tether 115 is attached at a position that is past the axle well 140 on the skidder 100. This attachment at a point beyond the axle well 140 is intended to provide a stronger attachment that is better able to manage the load of the tether 115. Further, attachment at a point further away from the blade 110 also reduces the angle through which the tether 115 at the attachment point 125 moves when the blade 110 is raised and lowered, which is intended to reduce wear at the attachment point 125 and the through-hole 120.

Figure 6:
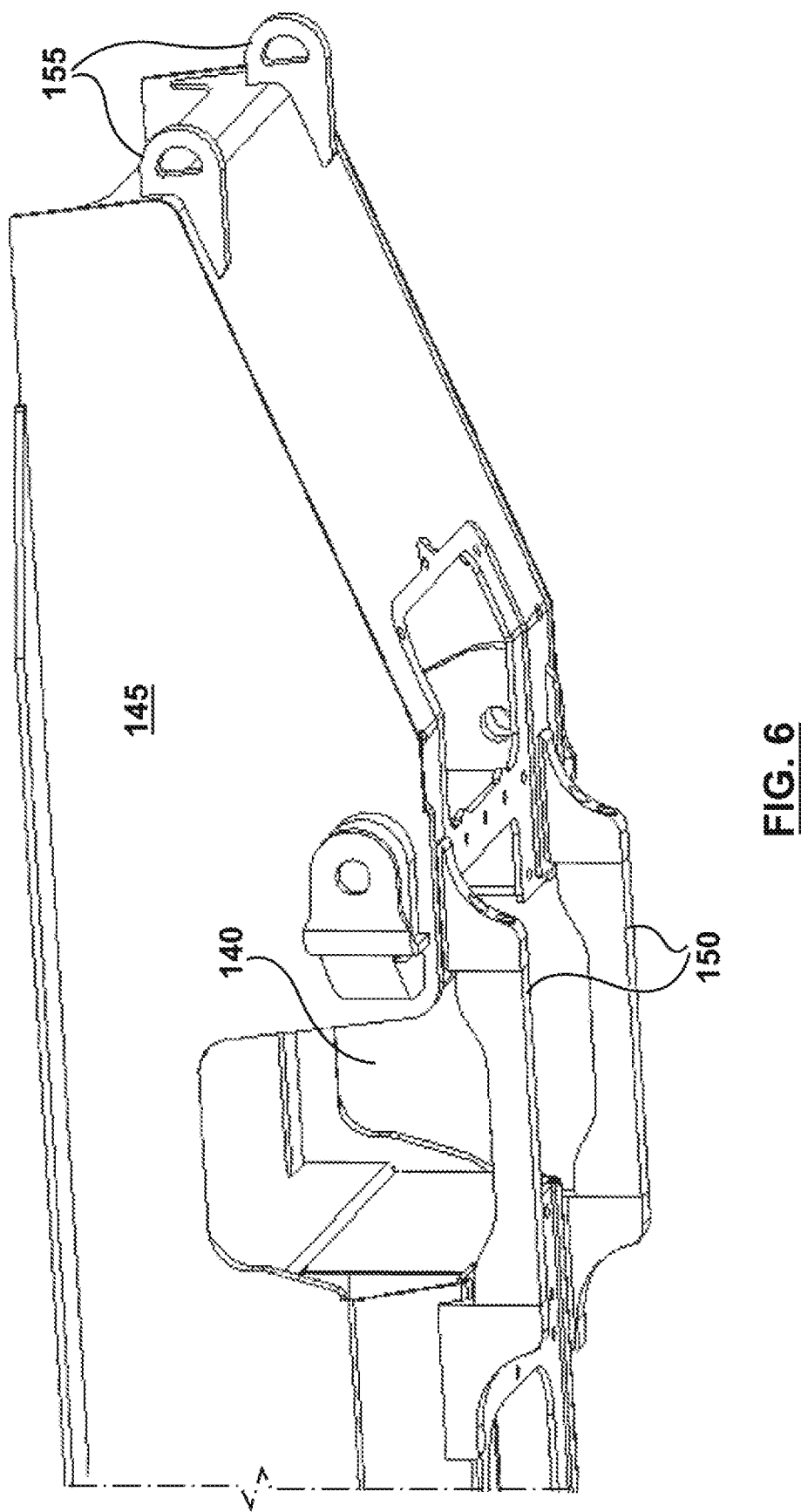
FIG. 6 illustrates a chassis of heavy equipment having frame stiffeners.

In other embodiments, as shown in FIG. 6, the skidder 100 and, in particular, a chassis 145 of the skidder 100, may be provided with frame stiffeners 150, for example, at the axle well 140 of the chassis 145 (typically below the axle well) to provide greater strength to the chassis 145 so that the tether 115 can be attached to standard tow lugs 155 at the front of the skidder 100 rather than at an attachment point 125 further along the chassis 145 away from the blade 115.

In FIG. 1, the tether 115 is illustrated as being a single tether line that divides at a shackle 160 into two tether lines attached on either side of the skidder 100. However, the tether 115 may alternatively include two tether lines (not shown), with one going to each side of the skidder chassis. Further, the tether may include additional tether lines and/or be divided into additional tether lines to provide further attachment points on the skidder.

In the case where there is a single tether line, the tether may pass through a through hole on the blade and extend to an attachment point on the chassis, for example, on the base of the skidder chassis.

It will be understood that some combination of the embodiments described or aspects of the embodiments used with conventional technology is also possible. For example, the blade 100 may have through holes 120 but the tether may be connected to tow lugs 155 already in place on the skidder 100. In this case, the skidder chassis may include one or more frame stiffeners 150 if needed to handle the load.

The above embodiments are intended to provide the benefit that it is still possible to use the blade as intended. That is, the blade can be lowered when the equipment is parked or when needed to remove an obstacle or the like without damaging the tether under the blade. Further, the blade can be lowered for use as a vehicle brake without damaging the tether under the blade. Still further, the use of stiffeners and/or attachment to the chassis at a point beyond the axle well in relation to the blade provides improved capability to handle the stresses put on the attachment point/chassis and on the chassis itself.

Interestingly, the use of one or more through holes in the blade allows an operator to move the tether in the vertical direction (via movement of the blade). This allows the tether to be moved in order to avoid obstacles and change the angle of the tether during operation. This allows for more efficient use of the tether in appropriate circumstances. Although something similar might be accomplished by placing the tether above the blade, this configuration above the blade may cause issues with forces on the blade and the attachment point when raising the blade.

The above-described embodiments are intended to be examples only. Alterations, modifications and variations can be effected to the particular embodiments by those of skill in the art without departing from the scope, which is defined solely by the claims appended hereto.

The invention claimed is:

1. A traction assist system for heavy equipment having an accessory, the system comprising:
    a tether configured such that a first end thereof can be attached to an object other than the heavy equipment, an accessory, and an attachment of the accessory thereof to provide traction assistance to the heavy equipment;
    an adaptation to the accessory, wherein the accessory is a blade, allowing the tether to be placed to allow the accessory to function without disrupting the tether, wherein the adaptation is a through-hole passing through the accessory and the tether passes through the through-hole; and
    an attachment point on the heavy equipment for attaching a second end of the tether.

2. A traction assist system according to claim 1, wherein the attachment point is positioned on the heavy equipment at a point past an axle well that is adjacent to the accessory.

3. A traction assist system according to claim 1, wherein the tether comprises a plurality of branches, the adaptation comprises a plurality of adaptations, and the attachment point comprises a plurality of attachment points.

4. A traction assist system according to claim 1, wherein the heavy equipment is forestry equipment.

5. A traction assist system for heavy equipment having a bulldozer blade, the system comprising:
    a tether configured such that a first end thereof can be attached to an object other than the heavy equipment, the bulldozer blade, and an attachment of the bulldozer blade thereof to provide traction assistance to the heavy equipment;
    a through-hole provided in the bulldozer blade, the through-hole passing through the blade and the tether passes through the through-hole; and
    an attachment point on the heavy equipment for attaching a second end of the tether.

6. A traction assist system according to claim 5, wherein the attachment point is positioned on the heavy equipment at a point past an axle well that is adjacent to the bulldozer blade.

7. A traction assist system according to claim 5, wherein the tether comprises a plurality of branches, the through-hole comprises a plurality of through-holes, and the attachment point comprises a plurality of attachment points.

8. A traction assist system according to claim 5, wherein the heavy equipment is forestry equipment.

9. A traction assist system according to claim 8, wherein the forestry equipment is a skidder.

10. A method for traction assist for heavy equipment having an accessory, the method comprising:
    providing a tether having a first end configured to attach to an object other than the heavy equipment, an accessory, and an attachment of the accessory thereof;
    adapting the accessory to allow the tether to pass through the accessory wherein the accessory is a blade and the adapting comprises providing a through-hole in the blade for the tether to pass through; and
    attaching a second end of the tether to an attachment point on the heavy equipment such that the tether provides traction assistance to the heavy equipment as a whole.

11. A method according to claim 10, wherein the tether comprises a plurality of branches, the adapting comprises a plurality of adaptations, and the attachment point comprises a plurality of attachment points.

12. A method according to claim 10, wherein the heavy equipment is forestry equipment.

13. A method according to claim 12, wherein the forestry equipment is a skidder.

14. A method according to claim 10, wherein the attachment point is positioned on the heavy equipment at a point past an axle well that is adjacent to the blade.

* * * * *